US011171575B2

(12) United States Patent
Corzine et al.

(10) Patent No.: US 11,171,575 B2
(45) Date of Patent: Nov. 9, 2021

(54) MODULAR MULTILEVEL CONVERTER TOPOLOGIES

(71) Applicant: The Regents of the University of California, Oakland, CA (US)

(72) Inventors: Keith Corzine, Santa Cruz, CA (US); Vahid Dargahi, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 16 days.

(21) Appl. No.: 16/855,755

(22) Filed: Apr. 22, 2020

(65) Prior Publication Data

US 2020/0336083 A1      Oct. 22, 2020

Related U.S. Application Data

(60) Provisional application No. 62/836,904, filed on Apr. 22, 2019.

(51) Int. Cl.
*H02M 7/483* (2007.01)
*H02M 7/5387* (2007.01)

(52) U.S. Cl.
CPC ....... *H02M 7/483* (2013.01); *H02M 7/53871* (2013.01); *H02M 7/4835* (2021.05)

(58) Field of Classification Search
CPC .... H02M 7/483; H02M 7/53871; H02M 7/66; H02M 7/79; H02M 7/5387; H02M 7/4835

See application file for complete search history.

(56) References Cited

U.S. PATENT DOCUMENTS

| | | | | |
|---|---|---|---|---|
| 7,709,314 | B2 * | 5/2010 | Madurawe | H01L 27/0688 |
| | | | | 438/199 |
| 10,819,217 | B2 * | 10/2020 | Ido | H02M 7/797 |
| 2017/0163171 | A1 * | 6/2017 | Park | H02M 7/483 |
| 2018/0083550 | A1 * | 3/2018 | Chung | H02M 7/5388 |
| 2018/0287509 | A1 * | 10/2018 | Fujii | H02M 7/48 |
| 2019/0207533 | A1 * | 7/2019 | Kikuchi | H02M 7/483 |

* cited by examiner

*Primary Examiner* — Adolf D Berhane
(74) *Attorney, Agent, or Firm* — Venable LLP; Henry J. Daley; Ryan T. Ward

(57) ABSTRACT

A Modular Multilevel Converter (MMC) circuit for converting DC power to AC and vice versa. At each respective connection to the AC power-source/load, the MMC circuit uses one Pulse Width Modulation Insulated Gate Bipolar Transistor (PWM IGBT) to control the switching between upper and lower arms of sub-modules. The circuit eliminates the inter-phase inductors often used in MMCs, and replaces the inductors by two complementary-gated PWM IGBTs, thereby eliminating circulating current. Moreover, the multilevel converter topology disclosed herein requires less number of components including PWM IGBTs and capacitors. In fact, at least two submodules per-phase are eliminated: one submodule in the upper arm and one submodule in the lower arm. In other words, the MMC topology not only mitigates the circulating current but also eliminates at least one submodule in the upper arm and at least one submodule in the lower arm per-phase.

14 Claims, 5 Drawing Sheets

MODULAR MULTILEVEL CONVERTER TOPOLOGIES

CROSS-REFERENCE TO RELATED APPLICATIONS

This application claims priority benefit from U.S. provisional patent application No. 62/836,904, filed on Apr. 22, 2019, the entire content of which is incorporated herein by reference.

BACKGROUND

1. Technical Field

The present disclosure relates to DC-AC converters, and more specifically to a modular multilevel converter which is capable of converting DC to three-phase AC or three-phase AC to DC.

2. Introduction

Converting Direct Current (DC) to Alternating Current (AC) electricity, and vice versa, is often done using a Modular Multilevel Converter (MMC). MMCs, such as the MMC 100 illustrated in FIG. 1, use three separate legs, each leg receiving a distinct phase of AC power 102. MMCs operate using an upper-arm and a lower-arm, where each respective arm connects to the positive 120 and negative 122 rails of a DC-voltage source 116, respectively. The MMC phase-leg is formed by connecting the upper arm (positive arm) to the lower arm (negative arm) through an inductor 104 being formed by inductors 106 with a midpoint 118. The upper and lower arms themselves are formed of cascaded submodules (SMs) 108, 110. While SM configurations can vary from application to application, in their simplest structure they are formed using a power switch-based half-bridge module and a capacitor, with the connection 112, 114 between each SM extending from a non-midpoint of a first SM to a midpoint between the power switches on a connected SM. The capacitor of each SM can be used to clamp the voltage of the power switches within each SM, with the voltage across each capacitor equaling 1 p.u., or 100% of the cell/capacitor voltage. In most MMC designs, this voltage is the same for all of the SMs.

However, a drawback of this design is circulating current among the SMs. This circulating current is generated due to the capacitors' voltage difference inside the upper and lower SMs. In other words, the SMs of the upper-arm are always connected to the SMs of the lower-arm due to the circulating current that flows through a path provided by the inductor 104. The circulating current does not contribute to the converter's output power. To account for the circulating current, power switches and capacitors with higher current ratings must be used within the SMs of the MMC 100. Moreover, the circulating current increases the operating junction temperature and restrains the semiconductor devices from switching at higher pulse-width-modulation (PWM) frequencies, all resulting in power loses due to this MMC topology.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

A Modular Multilevel Converter (MMC) circuit, configured as disclosed herein, can include: an upper arm connected to the positive rail of a DC (Direct Current) voltage source; a lower arm connected to the negative rail of the DC voltage source; and a midpoint connecting the lower arm and the upper arm, wherein: the upper arm and the lower arm are respectively comprised of plurality of serially connected submodules; the upper arm connects to the midpoint using a first Pulse-Width-Modulation Insulated-Gate Bipolar Transistor (PWM IGBT) as an upper arm connection; the lower arm connects to the midpoint using a second PWM IGBT as a lower arm connection; and the upper arm connection being complementary gated with respect to the lower arm connection.

An integrated circuit, configured as disclosed herein, can include: an upper arm plurality of serially electrically-connected submodules; a lower arm plurality of serially electrically-connected submodules, and a midpoint electrically connecting the lower arm plurality of serially connected submodules and the upper arm plurality of serially connected submodules, wherein: the upper arm plurality of serially electrically-connected submodules is electrically connected to the midpoint via a first PWM switch; the lower arm plurality of serially electrically-connected submodules is electrically connected to the midpoint via a second PWM switch; and the first PWM switch and the second PWM switch are complementary gated with respect to each other.

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

A MMC can be used to convert DC electricity to AC and vice versa. In at least one embodiment of the disclosed invention, this conversion is accomplished by a MMC employing a series connection of modular submodules to form the converter's phase-leg, the phase leg being that portion of the MMC circuit associated with a specific phase of the AC. The SMs in the upper-arm and lower-arm of the disclosed MMC topology, in their simplest configurations, are realized by a capacitor and a half-bridge or full-bridge module. The half-bridge/full bridge modules utilize Pulse Width Modulation (PWM) Insulated Gate Bipolar Transistors (IGBTs), with an additional half-bridge structure formed by complementary switching PWM IGBTs. This additional half-bridge module is used for connecting the upper arm to the lower arm, and its power switches are configured to switch due to complementary signals on their respective PWM IGBTs. Configuring the PWM IGBTs in this manner eliminates the circulating current among the SMs which is present in the classic MMC topology illustrated in FIG. 1. In addition, utilizing this complementarily switching half-bridge module to connect the SMs of the upper arm to the SMs of the lower arm mitigates the circulating current. The elimination of circulating current within the SMs of upper arm and lower arm results in a lower operating junction temperature, and also increases switching frequency and power capabilities.

Figure 1:
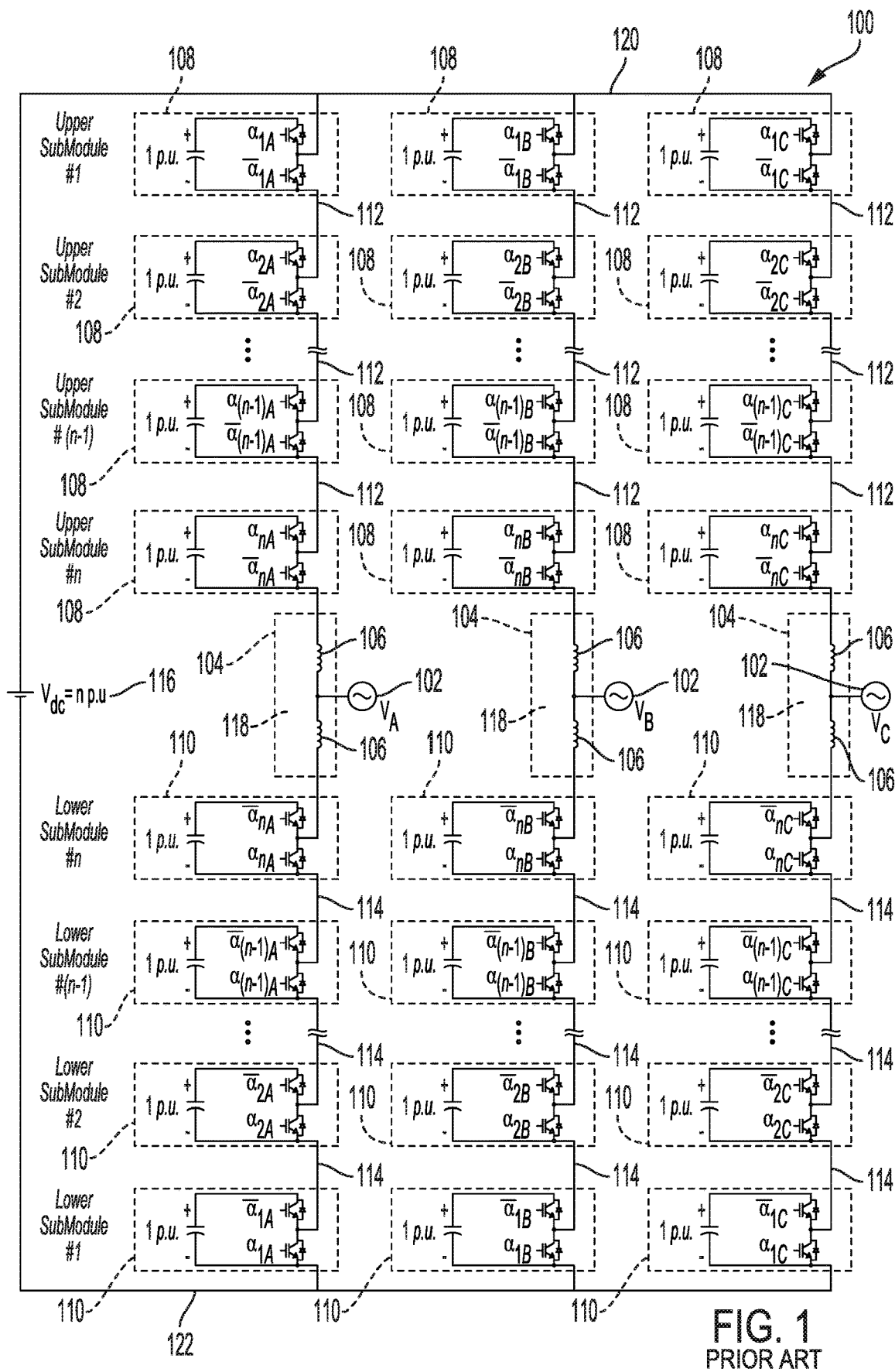
FIG. 1 illustrates an example of a conventional modular multilevel converter configuration.

The disclosed MMC topology retains the modularity feature of the SMs in the classic MMC illustrated in FIG. 1. An (n+1) level three-phase MMC as disclosed herein includes (n−1) SMs in the upper-arm and (n−1) SMs in the lower arm per-phase, thereby eliminating two of the SMs per-phase required in the classic design. Assuming an n-p.u. voltage for the DC source, the IGBTs and the capacitors in all 2×(n−1) SMs per-phase will have a consistent 1 p.u. DC voltage rating.

These variations and others shall be described herein as the various embodiments are set forth. The steps and examples outlined herein are examples only, and can be implemented in any combination thereof, including combinations that exclude, add, or modify certain components.

Figure 2:
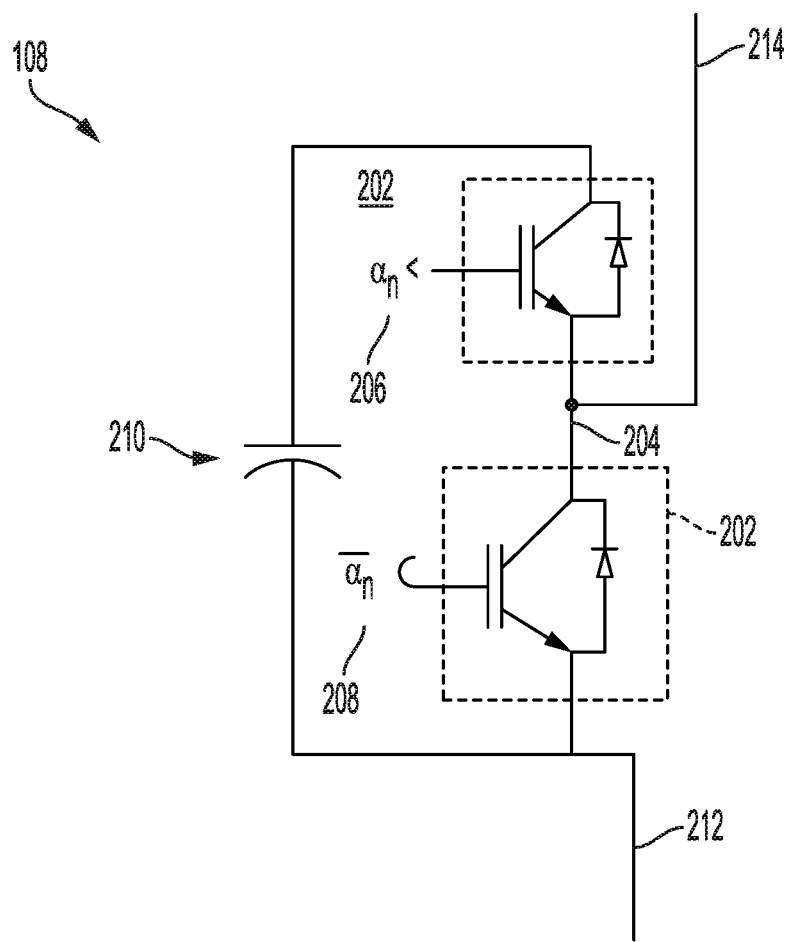
FIG. 2 illustrates an example submodule according to an embodiment of the invention.

FIG. 2 illustrates an example submodule 108. In this example, the submodule 108 has two IGBTs 202 electrically connected at a midpoint 204. Each respective IGBT 202 within the submodule 108 is complementary gated, with the input pulse to the "upper" IGBT being $\alpha_n$ 206 and the "lower" IGBT input pulse being $\overline{\alpha}_n$ 208 (the bar indicating the complementary or opposite). The SM 108 capacitor 210 has a voltage rating of 1 p.u. The SM 108 is electrically connected to other SMs through two electrical connections 212, 214, one of the electrical connections 214 extending from the midpoint 204 between the two IGBTs 202.

Figure 3:
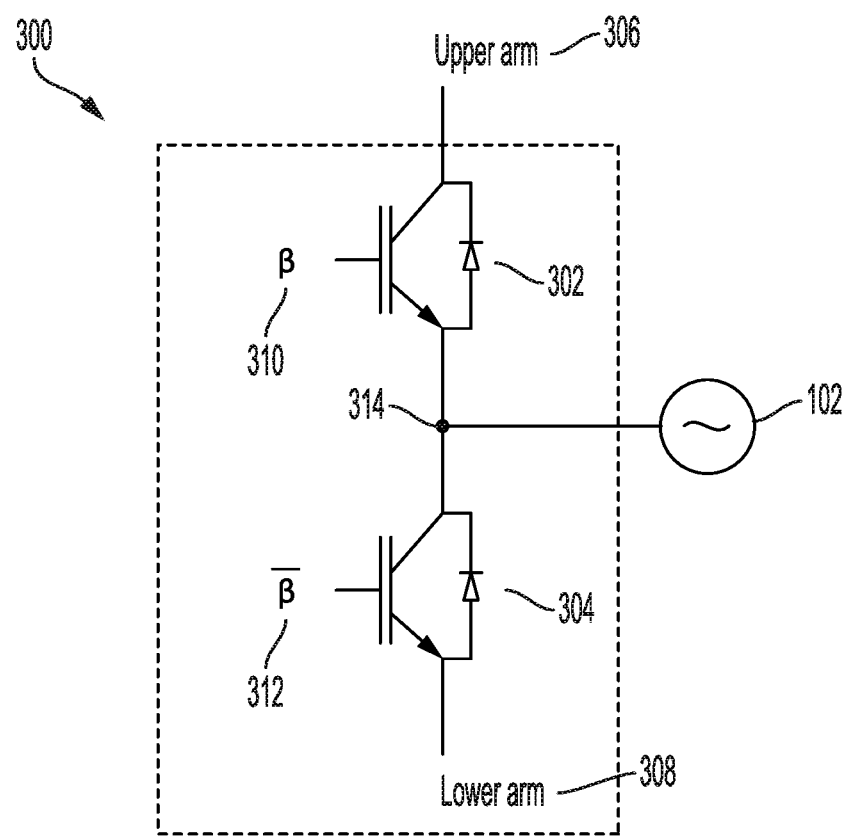
FIG. 3 illustrates an example bridge structure to connect the upper arm to the lower arm according to an embodiment of the invention.

FIG. 3 illustrates an example bridge structure 300 to connect the upper arm of SMs 306 to the lower arm of SMs 308. In this example bridge structure 300, the IGBTs 302, 304 are electrically connected at a midpoint 314 to an AC power-source/load 102. The IGBT 302 electrically connected to the upper arm of SMs 306 has input voltage pulse $\beta$, while the IGBT 304 electrically connected to the lower arm of SMs 308 has input pulse $\overline{\beta}$, which is the complementary (opposite) of the input pulse $\beta$. In this example bridge structure 300, the IGBTs 302, 304 have a voltage rating of 1 p.u.

Figure 4:
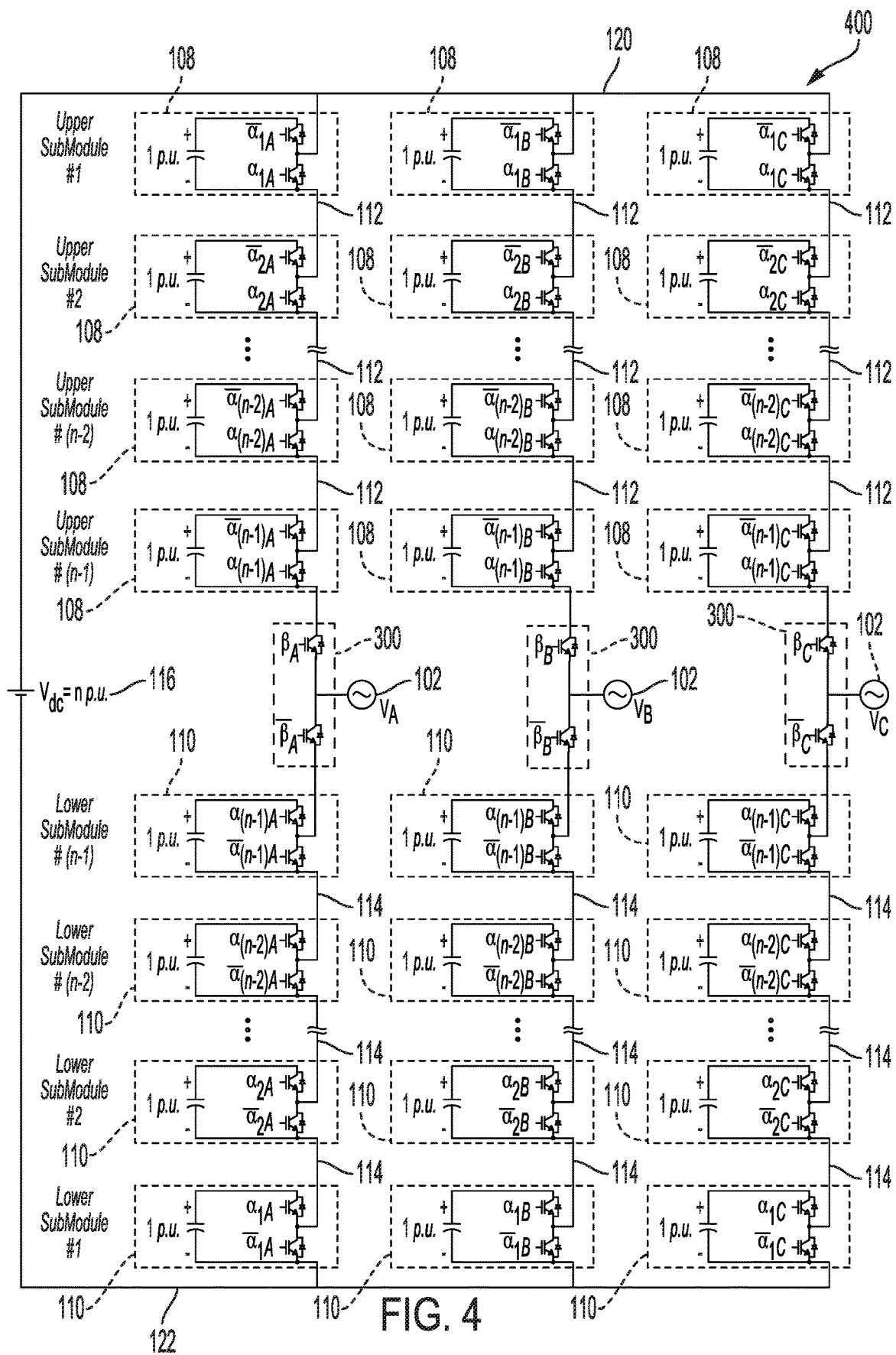
FIG. 4 illustrates an example MMC using the example bridge structure of FIG. 3 according to an embodiment of the invention.

FIG. 4 illustrates an example MMC 400 using the example bridge structure of FIG. 3. This example is identical to that of FIG. 1, with the exception that the bridge structure 300 of FIG. 3 is used in place of the inductor 104 of FIG. 1 along with elimination of two submodules per-phase, one submodule in upper arm and one submodule in lower arm, in the conventional MMC topology of FIG. 1. As described above, at the midpoint 312 of the bridge structure 300 is a connection to the AC power source/load 102, and as illustrated here, that AC power source/load can have multiple phases (e.g., three-phase AC power source/load).

Figure 5:
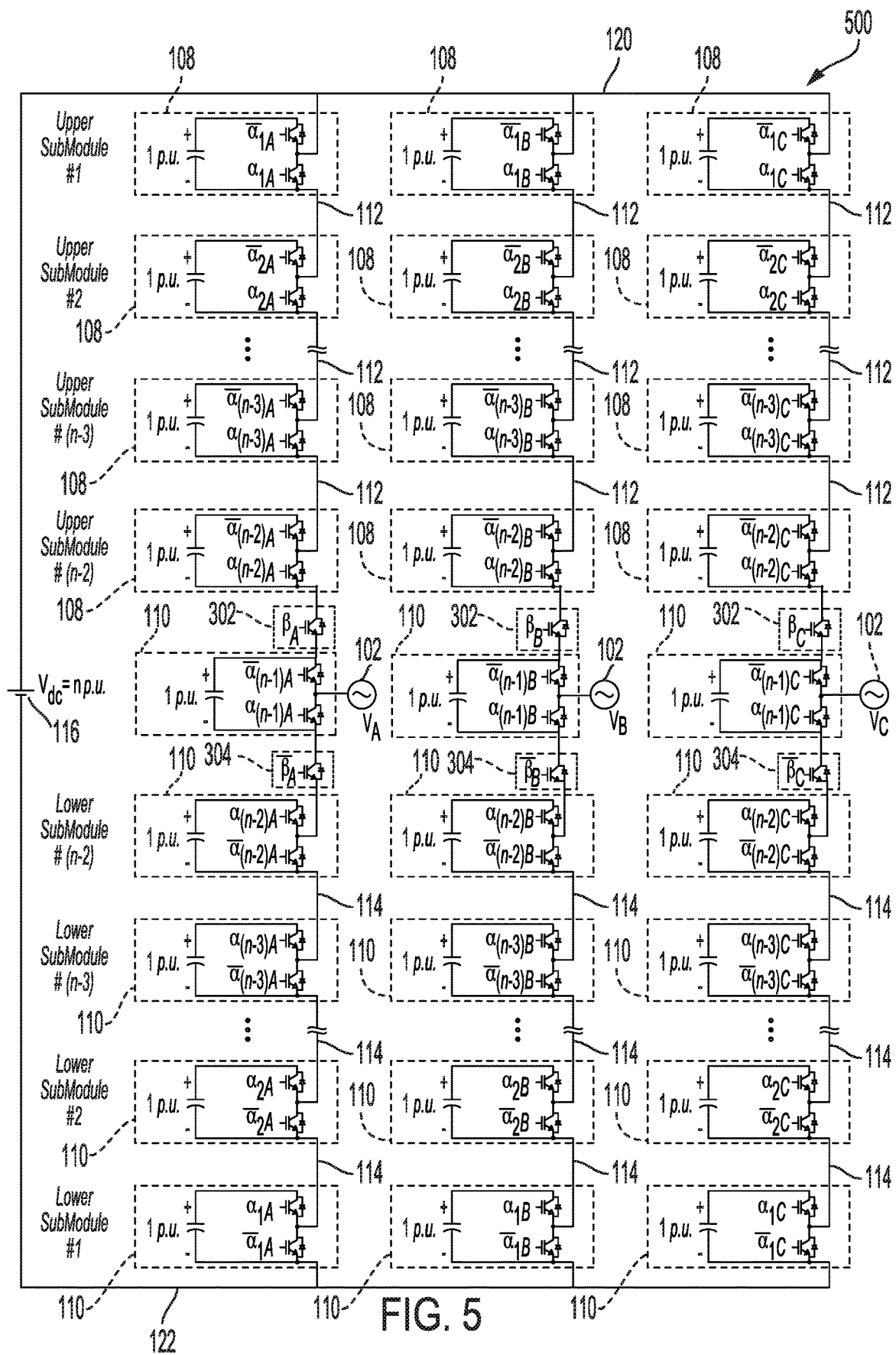
FIG. 5 illustrates an example MMC with a common-SM used at the midpoint connecting the upper arm to the lower arm using two complementary gated PWM IGBTs.

FIG. 5 illustrates an example MMC 500 with a SM 110 used at the midpoint connecting the upper arm to the lower arm. As illustrated, in this configuration 500, a submodule 110 identical to those used in the upper and lower arms is located at the midpoint connecting the upper and lower arms. Connecting this midpoint submodule 110 to the upper and lower arms are (for each arm) two PWM IGBTs 302, 304. The respective pairs of PWM IGBTs 302, 304 having complementary switching pulses with respect to each other are gated identically to the upper or lower arms, respectively, as are the PWM IGBTs within the submodule 110. The complementary switching pulses of PWM IGBTs of 302 and 304, with respect to each other, mitigates the circulating current in this topology. The output to the AC power source/load 102 is the midpoint between the two PWM IGBTs of the submodule 110. In this configuration, the common-SM between the upper and lower arms replaces the inter-phase reactors within each phase in prior art designs. Furthermore, it eliminates four submodules per-phase of the classic MMC topology: two submodules in the upper arm and two submodules in the lower arm.

A Modular Multilevel Converter (MMC) circuit, configured as disclosed herein, can include: an upper arm connected to a positive rail of a DC (Direct Current) voltage source; a lower arm connected to a negative rail of the DC voltage source; and a midpoint connecting the lower arm and the upper arm, wherein: the upper arm and the lower arm are respectively comprised of plurality of serially connected submodules; the upper arm connects to the midpoint using a first Pulse-Width-Modulation Insulated-Gate Bipolar Transistor (PWM IGBT) as an upper arm connection; the lower arm connects to the midpoint using a second PWM IGBT as a lower arm connection; and the upper arm connection being complementary gated with respect to the lower arm connection.

The submodules of the MMC can each respectively be formed by a half-bridge circuit or a full-bridge circuit configurations. In a half-bridge topology for SMs, each submodule in said plurality of serially connected submodules can include: a capacitor; two PWM IGBTs having complementary gated switching signals (states); and a submodule midpoint electrically connected to each of said two PWM IGBTs and a cascaded submodule in said plurality of serially connected submodules. In addition, said submodule midpoint of a first upper submodule of said upper arm can be electrically connected to the positive rail of the DC voltage source, and said submodule non-midpoint of a first lower submodule of said lower arm can be electrically connected to the negative rail of the DC voltage source.

In an example embodiment, the midpoint can be a submodule, with an upper arm PWM IGBT, the upper arm PWM IGBT electrically connected to the upper arm, the upper arm PWM IGBT being gated identically to the upper arm; a lower arm PWM IGBT, the lower arm PWM IGBT electrically connected to the lower arm, the lower arm PWM IGBT being gated identically to the lower arm; the upper arm PWM IGBT gated complementary with respect to the one lower arm PWM IGBT, thereby eliminating any circulating-current; and the midpoint submodule including: a capacitor; two midpoint PWM IGBTs having complementary gated switching states; and a submodule midpoint electrically connected to each of the two midpoint PWM IGBTs.

An integrated circuit, configured as disclosed herein, can include: an upper arm plurality of serially electrically-connected submodules; a lower arm plurality of serially electrically-connected submodules, and a midpoint electrically connecting the lower arm plurality of serially connected submodules and the upper arm plurality of serially connected submodules, wherein: the upper arm plurality of serially electrically-connected submodules is electrically connected to the midpoint via a first PWM switch; the lower arm plurality of serially electrically-connected submodules is electrically connected to the midpoint via a second PWM switch; and the first PWM switch and the second PWM switch are complementary gated with respect to each other.

The submodules of the integrated circuit can each respectively be formed by a half-bridge circuit or a full-bridge circuit configurations. In a half-bridge topology for SMs, each submodule in said plurality of serially connected submodules can include: a capacitor; two PWM IGBTs having complementary gated switching signals (states); and a submodule midpoint electrically connected to each of said two PWM IGBTs and a cascaded submodule in said plurality of serially connected submodules. In addition, said submodule midpoint of a first upper submodule of said upper arm can be electrically connected to the positive rail of the DC voltage source, and said submodule non-midpoint of a first lower submodule of said lower arm can be electrically connected to the negative rail of the DC voltage source.

In one example embodiment, the midpoint can further include an upper arm PWM IGBT, the upper arm PWM IGBT electrically connected to the upper arm plurality of serially electrically-connected submodules, the upper arm PWM IGBT being gated identically to the upper arm plurality of serially electrically-connected submodules; a lower arm PWM IGBT, the lower arm PWM IGBT electrically connected to the lower arm plurality of serially electrically-connected submodules, the lower arm PWM IGBT being gated identically to the lower arm plurality of serially electrically-connected submodules; the upper arm PWM IGBT having a complementary gated switching state with respect to the lower arm PWM IGBT, thereby eliminating circulating-current; and a midpoint submodule comprising: a capacitor; two midpoint PWM IGBTs having complementary gated switching pulses; and a submodule midpoint electrically connected to each of said two midpoint PWM IGBTs.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A Modular Multilevel Converter (MMC) circuit, comprising:
   an upper arm connected to a positive rail of a DC (Direct Current) voltage source;
   a lower arm connected to a negative rail of said DC voltage source; and
   a midpoint connecting said lower arm and said upper arm, wherein:
   said upper arm and said lower arm are respectively comprised of a plurality of serially connected submodules;
   said upper arm connects to said midpoint using a first Pulse-Width-Modulation Insulated-Gate Bipolar Transistor (PWM IGBT) as an upper arm connection;
   said lower arm connects to said midpoint using a second PWM IGBT as a lower arm connection; and
   said upper arm connection being complementary gated with respect to said lower arm connection.

2. The MMC circuit of claim 1, each submodule, in a half-bridge topology, in said plurality of serially connected submodules comprising:
   a capacitor;
   two PWM IGBTs having complementary gated switching states; and
   a submodule midpoint electrically connected to each of said two PWM IGBTs and a cascaded submodule in said plurality of serially connected submodules.

3. The MMC circuit of claim 2,
   wherein said submodule midpoint of a first upper submodule of said upper arm is electrically connected to the positive rail of the DC voltage source; and
   wherein a submodule non-midpoint of a first lower submodule of said lower arm is electrically connected to the negative rail of the DC voltage source.

4. The MMC circuit of claim 2, wherein each submodule in said plurality of serially connected submodules forms a half-bridge circuit.

5. The MMC circuit of claim 2, wherein each submodule in said plurality of serially connected submodules forms a full-bridge circuit.

6. The MMC circuit of claim 1, wherein said midpoint further comprises:
   an upper arm PWM IGBT, said upper arm PWM IGBT electrically connected to said upper arm, said upper arm PWM IGBT being gated identically to said upper arm;
   a lower arm PWM IGBT, said lower arm PWM IGBT electrically connected to said lower arm, said lower arm PWM IGBT being gated identically to said lower arm; and
   a midpoint submodule comprising:
      a capacitor;
      two midpoint PWM IGBTs having complementary gated switching states; and
      a submodule midpoint electrically connected to each of said two midpoint PWM IGBTs.

7. The MMC circuit of claim 6,
   wherein a commutation sequence of said upper arm PWM IGBT and said lower arm PWM IGBT is used based on a direction of at least one of load current or SM current,
   wherein said commutation sequence ensures that a blocking voltage of said midpoint of said upper arm PWM IGBT and said lower arm PWM IGBT is limited to 1 p.u.

8. The MMC circuit of claim 1,
   wherein a commutation sequence of said first PWM IGBT and said second PWM IGBT is used based on a direction of at least one of load current or SM current,
   wherein said commutation sequence ensures that a blocking voltage of said midpoint of said first PWM IGBT and said second PWM IGBT is limited to 1 p.u.

9. An integrated circuit, comprising:
   an upper arm plurality of serially electrically-connected submodules;
   a lower arm plurality of serially electrically-connected submodules, and
   a midpoint electrically connecting said lower arm plurality of serially electrically-connected submodules and said upper arm plurality of serially electrically-connected submodules, wherein:
  said upper arm plurality of serially electrically-connected submodules is electrically connected to said midpoint via a first PWM switch;
  said lower arm plurality of serially electrically-connected submodules is electrically connected to said midpoint via a second PWM switch; and
  said first PWM switch and said second PWM switch are complementary gated with respect to each other.

10. The integrated circuit of claim 9, wherein each submodule in said upper arm plurality of serially electrically-connected submodules and said lower arm plurality of serially electrically-connected submodules comprise:
  a capacitor;
  two PWM IGBTs having complementary gated switching states; and
  a submodule midpoint electrically connected to each of said two PWM IGBTs and a cascaded submodule in one of said upper arm plurality of serially electrically-connected submodules and said lower arm plurality of serially electrically-connected submodules.

11. The integrated circuit of claim 10,
  wherein said submodule midpoint of a first upper submodule of said upper arm plurality of serially electrically-connected submodules is electrically connected to a positive rail of a DC voltage source; and
  wherein a submodule non-midpoint of a first lower submodule of said lower arm plurality of serially electrically-connected submodules is electrically connected to a negative rail of said DC voltage source.

12. The integrated circuit of claim 10, wherein said submodule forms a half-bridge circuit.

13. The integrated circuit of claim 10, wherein said submodule forms a full-bridge circuit.

14. The integrated circuit of claim 10, wherein said midpoint further comprises:
  an upper arm PWM IGBT, said upper arm PWM IGBT electrically connected to said upper arm plurality of serially electrically-connected submodules, said upper arm PWM IGBT being gated identically to said upper arm plurality of serially electrically-connected submodules;
  a lower arm PWM IGBT, said lower arm PWM IGBT electrically connected to said lower arm plurality of serially electrically-connected submodules, said lower arm PWM IGBT being gated identically to said lower arm plurality of serially electrically-connected submodules; said upper arm PWM IGBT having a complementary switching pulses with respect to said lower arm PWM IGBT; and
  a midpoint submodule comprising:
    a capacitor;
    two midpoint PWM IGBTs having complementary gated switching states; and
    a submodule midpoint electrically connected to each of said two midpoint PWM IGBTs.

* * * * *